Figure 1:
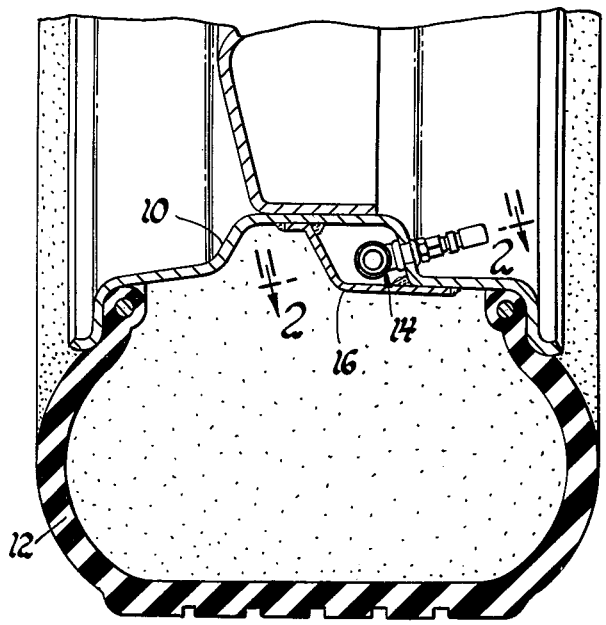

United States Patent [19]

Byram

[11] 4,235,185

[45] Nov. 25, 1980

[54] LOW TIRE PRESSURE SENSOR AND AIR SWITCH THEREFOR

[75] Inventor: Robert J. Byram, Grand Blanc, Mich.

[73] Assignee: General Motors Corporation, Detroit, Mich.

[21] Appl. No.: 58,738

[22] Filed: Jul. 18, 1979

[51] Int. Cl.³ .............................................. B60C 23/04
[52] U.S. Cl. ................................. 116/34 R; 73/146.8; 340/58
[58] Field of Search ..................... 116/34 R; 73/146.2, 73/146.3, 146.8; 340/58; 137/227; 200/61.22, 61.25

[56] References Cited

U.S. PATENT DOCUMENTS

| | | | |
|---|---|---|---|
| 2,629,086 | 2/1953 | Ainsworth et al. | 340/58 |
| 2,798,449 | 7/1957 | Catlin | 116/34 R |
| 3,479,868 | 11/1969 | Boyer | 73/146.8 |
| 3,521,230 | 7/1970 | Poole | 340/58 |
| 3,537,068 | 10/1970 | Amundsen, Jr. | 340/58 |
| 3,719,159 | 3/1973 | Davis | 116/34 R |
| 3,827,393 | 8/1974 | Winther | 116/34 R |
| 4,130,745 | 12/1978 | Hetzer | 200/82 E |

FOREIGN PATENT DOCUMENTS 641154  5/1962  Canada ................................. 116/34 R Primary Examiner—Daniel M. Yasich
Attorney, Agent, or Firm—Warren D. Hill

[57] ABSTRACT

A low tire pressure sensor for emitting a magnetic signal when the tire pressure reaches a low limit pressure includes a signal device having a magnet movable from a storage position to an actuated position by tire pressure applied to the magnet from an air switch. The air switch includes a bellows charged to a reference pressure and exposed to tire pressure for moving in response to tire pressure changes, and a three-way valve operated by the bellows for venting the signal device to atmospheric pressure when the tire pressure is normal and for closing the vent and applying tire pressure to the signal device to actuate it when the pressure drops below a preset low pressure.

3 Claims, 4 Drawing Figures

LOW TIRE PRESSURE SENSOR AND AIR SWITCH THEREFOR

This invention relates to a low tire pressure sensor and particularly to an air switch responsive to tire pressure attaining a predetermined low level.

There has previously been proposed, as exemplified in the U.S. Pat. No. to Lorenz et al 3,977,355, a low tire pressure warning system comprising an air switch mounted within a tire and responsive to the tire pressure to emit an air pulse whenever the tire pressure drops below a predetermined low level. The air pulse, in turn, is supplied to an actuator which provides a signal across the gap between a rotating tire and a vehicle so that a detection circuit on the vehicle can issue a warning to the vehicle operator when the low pressure event occurs. In particular, it has been proposed to provide an actuator comprising a magnet movable in response to the air pulse from a storage position to an actuated signal emitting position. During normal tire pressure conditions atmospheric pressure is applied to the actuator by a vent but at low tire pressure the air pulse is emitted from the air switch and the resulting movement of the actuator causes closure of the vent to avoid leakage of the tire pressure through the air switch to atmosphere.

It is a general object of the invention to provide an air switch for a low tire pressure warning system which selectively supplies tire pressure and atmospheric pressure to an actuator according to the state of the air switch. It is a further object of this invention to provide a low tire pressure sensor which requires no air vent valving in the actuator.

The invention is carried out by providing an air switch for a low tire pressure sender including a valve having an input port connected to tire pressure, a second input port connected to atmospheric pressure and an outlet port for connection to an actuator and a bellows precharged to a reference pressure and exposed to the tire pressure to move according to changes in tire pressure and arranged to operate the valve so that during normal tire pressure the atmospheric pressure is admitted to the outlet port and at low tire pressure the tire air is admitted to the outlet port. The invention further comprehends a tire pressure sensor having in combination with such an air switch a signal device or actuator maintained in a nonsignalling mode when subject to atmospheric pressure and actuated to a signalling mode when subject to tire pressure.

Figure 3:
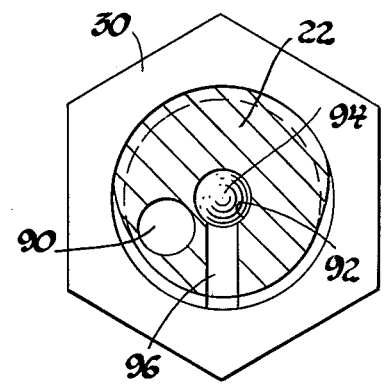
Figure 4:
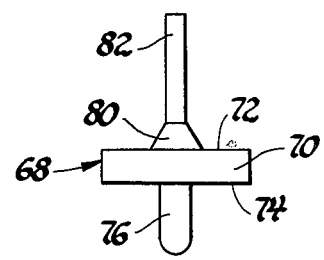
Figure 2:
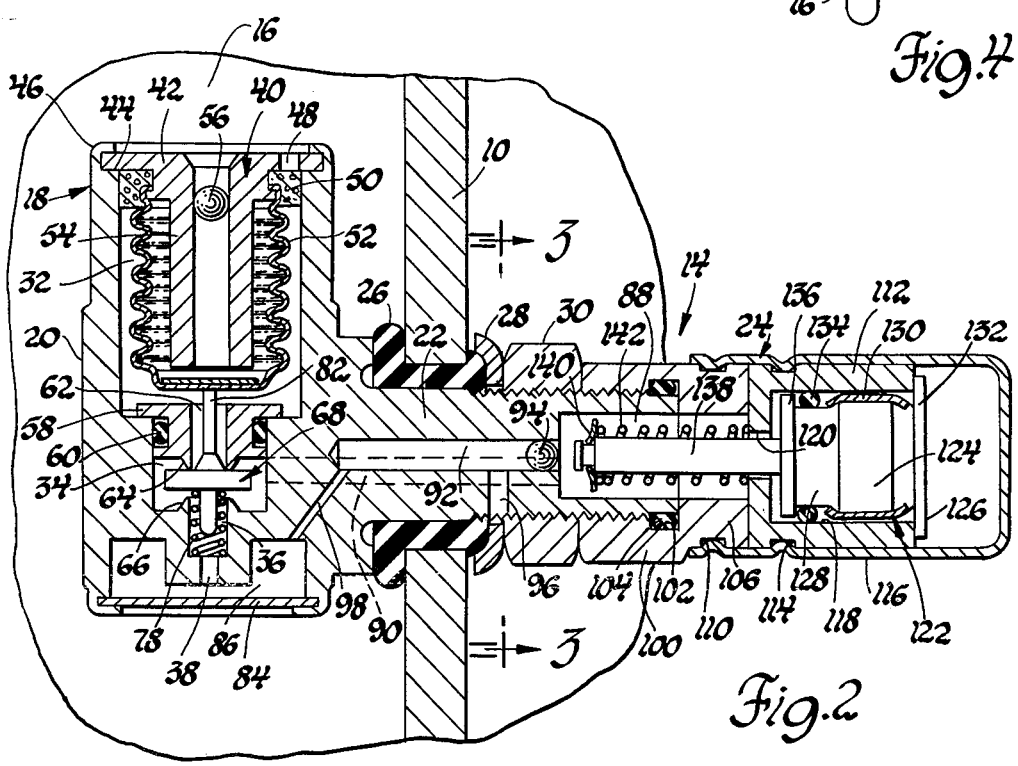

The above and other advantages will be made more apparent from the following specification taken in conjunction with the accompanying drawings wherein like reference numerals refer to like parts and wherein:

FIG. 1 is a cross-sectional view of a pneumatic tire and rim assembly incorporating a low tire pressure sensor according to the invention, FIG. 2 is a cross-sectional view of a low tire pressure sensor assembly according to the invention, FIG. 3 is a cross-sectional view taken along lines 3—3 of the sensor of FIG. 2, and FIG. 4 is an enlarged view of a valve of FIG. 2.

Referring to FIG. 1, a drop center rim 10 has a pneumatic tire 12 mounted thereon and a low tire pressure sensor 14 is mounted in the drop center of the rim inside the wheel and has a portion extending through an aperture in the rim. A guard member 16 secured within the rim and surrounding the sensor 14 protects the sensor from damage during mounting of the tire to the rim. As shown in FIG. 2, the sensor 14 comprises an air switch 18 having a housing 20 located within the tire and a stem 22 extending through an aperture in the rim 10 and a signal device or actuator 24 threadedly mounted on the stem 22 outside of the tire. A resilient grommet 26 surrounding the base of the stem and fitting through the aperture in the rim 10 provides an air seal around the stem and a washer 28 bears against the grommet while a nut 30 threaded on the stem 22 secures the air switch 18 to the rim 10.

The housing 20 is hollow comprising a series of stepped bores of decreasing diameter with the largest bore at one end comprising a chamber 32, the next bore comprising a valve cavity 34, the third bore defining a valve guide 36 and the final and smallest bore serving as an orifice 38. A bellows assembly 40 received within the chamber 32 has an annular flange 42 defining an end of the chamber 32 and seats on a shoulder 44 formed near the end of the housing which is crimped over at 46 to retain the bellows assembly to the housing. An aperture 48 in the flange 42 admits tire air into the chamber 32. An annulus of filter material 50 lying against the flange 42 and covering the aperture 48 prevents dirt particles from the tire from entering the air switch 18. A bellows 52 is sealed to the annular flange 42 and a tubular portion 52 extends from the flange 42 into the bellows. The bellows is precharged to a specified pressure corresponding to the desired tire inflation warning pressure and a ball 56 is pressed into the tubular portion to seal the bellows.

An insert 58 fitted with a peripheral O-ring seal 60 is inserted in the cavity 34 to define a wall between the chamber 32 and a cavity 34. A central passage way 62 through the insert 58 terminates in an annular rim portion serving as a valve seat 64 on the cavity side of the insert. The end of the cavity 34 surrounding the valve guide bore 36 is formed in an annular inwardly flared rim serving as a valve seat 66. A control member or poppet 68, also shown in FIG. 4, is located in the cavity 34 and comprises a flat disk 70 having opposed faces 72 and 74 for seating against the valve seats 64 and 66, respectively. A guide pin 76 depending from the face 74 is slidably received in the guide bore 36 along with a coil spring 78 which biases the poppet 68 against the seat 64. The conical locating portion 80 projecting from the center of the face 72 is dimensioned to fit within the passage 62 to help center the poppet with respect to the passage 62 and a cylindrical pin 82 extends axially from the apex of the cone 80 and projects through the passage 62 into the chamber 32 adjacent to the movable end of the bellows 52. The valve seats are so spaced and the poppet is so dimensioned that slight axial movement of the poppet is sufficient to cause the poppet to move from a position seating against the seat 64 to a position seating against the seat 66. An end plate 84 crimped across an end of the housing 20 covers over a recess 86 which is in communication with the orifice 38.

The stem 22 projects laterally from the housing 20 in a region generally aligned with the cavity 34. A counter bore 88 is formed in the outer end of the stem 22. A signal passage 90 (shown in dotted lines) extends between the counter bore 88 and the cavity 34. A passage 92 in the stem parallel to the passage 90 extends from the counter bore 88 to a blind end short of the cavity 34. A ball seal 94 plugs the end of the passage 92 adjacent the counter bore. A lateral passage 96 extends from the side of the passage 92 to the exterior threaded portion of the stem 22 in the vicinity of the washer 28. A diagonal passage 98 connects the passage 92 with the recess 86. The mouth of the lateral passage 96 opening adjacent the washer 28 and/or the nut 30 allows air to bleed from a passage 92 to the atmosphere through the interstices of the washer and nut, yet the vent passages thus formed are sufficiently small to effect filtering action to prevent the entrance of foreign particles into the system. The sectional view of FIG. 3 illustrates the relative position of the passages within the stem.

The poppet or control member 68 in the valve cavity 34 defines a valve having a first port comprising the passage 62 terminating in the valve seat 64 for admitting tire pressure from the tire via the chamber 32 to the valve cavity 34, a second port in the cavity comprising the bore 36 terminating the valve seat 66 and vented to atmosphere via the air passage including the bore 36, orifice 38 and passages 92, 96 and 98, and a third port defined by the junction of passageway 90 with the cavity and forming an outlet for supplying a pneumatic signal or atmospheric pressure to the actuator 24 depending on the position of the poppet 68 which is arranged to selectively open and close the first or second ports to the cavity.

The actuator 24 has at one end a nut 100 suitable for threading on the end of the stem 22 which nut has an internal groove 102 containing an O-ring 104 for sealing against the end of the stem 22. The nut terminates in a head 106 which has a central aperture aligned with the counter bore 88 in the stem. An annular groove 110 is formed on the exterior surface of the head 106. A cup-shaped shunt member 112 adjacent the head 106 formed of ferromagnetic material having an outer diameter generally consistent with that of the nut 100 also has a peripheral groove 114. An outer cup-shaped cap 116 formed of nonmagnetic material such as brass fits around the head 106 of the nut and the shunt piece 112 and is crimped into the annular grooves 110 and 114 to secure together the nut, the shunt piece and the cap 116. The end of the cap 116 is substantially spaced from the shunt piece 112. The shunt piece is formed with an inner bore 118 and has an aperture 120 extending centrally through the bottom of the cup.

A magnet assembly 122 comprises a permanent magnet 124, an outer polepiece 126 of magnetic material and an inner polepiece 128 of magnetic material all held together by a sheath 130 which is crimped to the respective polepieces. The outer polepiece includes a radially extending annular flange 132 of greater diameter than the bore 118 in the shunt piece so that it will in normal position lie in contact with the end of the shunt piece 112. The remainder of the magnet assembly 122 slidably fits within the bore 118. An O-ring 134 around the polepiece 128 forms a seal between the magnet assembly and the bore 118. A small flange 136 on the inner end of the polepiece 128 retains the O-ring. A shaft 138 is secured to the polepiece 128 and extends through the aperture 120 into the counter bore 88 of the stem. A clip 140 secured to a groove in the end of the shaft 138 retains a coil spring 142 which surrounds the shaft and abuts against the clip 140 at one end and the bottom of the shunt piece 112 at the other end to thereby bias the magnet assembly toward the position in the cup shown in the drawings while allowing the magnet assembly to shift to a position partially outside the cup adjacent the end of the cap 116.

The magnet assembly acts as a piston within a cylinder so that when air pressure is applied through the passage 90 to the actuator unit, the magnet assembly will move away from the shunt piece 112. When the flange 132 of the polepiece 126 is in contact with the end of the shunt piece 112, the magnetic flux from the magnet is shunted through the shunt piece 112 and the consequent magnetic field existing outside of the cap 116 is very weak. In addition, the magnetic force between the shunt and the polepiece 126 helps hold the magnet assembly in the storage position. When, however, the magnet assembly shifts away from the shunt piece 112, the shunted portion of the magnetic field decreases and the external field passing outside the cap 116 is sharply increased. That increased magnetic field then is sensed by a magnetic detector such as a reed switch, not shown, secured to a stationary portion of a vehicle adjacent the path of movement of the signal device 24.

In operation, when the tire pressure is above the low pressure limit, say 20 psi, the pressure sensor is in the condition depicted in the drawing. That is, the pressure in the chamber 32 is sufficiently great to maintain the bellows at a position just touching the pin 82 or separated from the pin 82 depending on the tire pressure. The spring 78 biases the poppet 68 against the seat 64 to prevent the flow of tire air through the port 48 in the passage 62. At the same time the poppet 68 is separated from the seat 66 so that a continuous pathway is available from the counter bore 88, the passage 90, the cavity 34, the valve guide bore 36, and the air passage comprising orifice 38, passages 98, 92 and 96 to assure atmospheric pressure in the counter bore 88. With that pressure, the spring 142 biases the magnet assembly into its shunted or stored position as shown in the drawing to assume a nonsignalling mode. Even in the event of a slow leak of tire air past the poppet 68, the vent arrangement to atmosphere will assure that the magnet is not prematurely actuated.

When the tire pressure drops to the low pressure limit or below, the pressure within the chamber 32 similarly decreases so that the bellows 52 expands against the pin 82 moving the poppet 86 from its seat 64. That valve opening allows tire air to flow through the cavity 38 and the signal passage 90 to the counter bore 88 and against the magnet assembly 122 to force that magnet assembly to the right into its signal emitting position or signalling mode, the force of the air pressure being sufficient to overcome the bias of the spring 142. In the event the poppet 68 is only slightly separated from the seat 64, tire air can also flow out through the orifice 38 and the passages 98, 92 and 96 to atmosphere. When, however, the tire pressure decreases to a second pressure limit just a little below that required to open the poppet the poppet will move into seating engagement with the seat 66 to close the path to atmosphere, thereby conserving tire air. Whenever the tire is restored to its normal inflation pressure or at least to a pressure above the minimum value, the bellows 52 will contract allowing the poppet 68 to close against the seat 64 and separate from the seat 66 whereupon the pressure within the signal device 24 will be vented to atmosphere and the magnet will be returned to its storage position by virtue of the force of the spring 142.

It will thus be seen that the low tire pressure sensor, as described herein, is readily provided as a unitary assembly for mounting on a tire and yet provides the flexibility of allowing various types of pressure actuated signalling devices to be coupled to the air switch either by direct connection as illustrated herein or by a remote coupling through a hose connection. In any event, due to the built-in vent to atmosphere in the air switch 18, the actuator or signalling device does not require that function thereby lending flexibility to the actuator design.

The embodiments of the invention in which an exclusive property or privilege is claimed are defined as follows:

1. An air switch for a low tire pressure sender to emit a pneumatic signal when tire pressure drops to a limit value, comprising:
   a valve cavity having first, second, and third ports, means including the first port for selectively admitting air under pressure from the tire to the valve cavity, the second port vented to atmospheric pressure, the third port comprising an outlet, a control member movable within the cavity for selectively placing the said first and second ports into communication with the third port, and bias means for urging the control member into a normal position to close the first port, and
   bellows means adapted to be exposed to the tire pressure and mounted in operative engagement with the control member, the bellows means being precharged to a reference pressure and adapted to expand with decreasing tire pressure for moving the control member from its normal position when the tire pressure decreases to a low limit value to open the first port to communication with the third port and emit a pneumatic signal to the outlet, the bellows means, upon expansion, further being effective to move the control member into position to close the second port thereby preventing passage of tire air through the second port.

2. An air switch for a low tire pressure sender to emit a pneumatic signal when tire pressure drops to a limit value, comprising:
   a valve cavity having first, second, and third ports, means including the first port for selectively admitting air under pressure from the tire to the valve cavity, the second port being aligned with the first port along a common axis and vented to atmospheric pressure, the third port comprising an outlet, a poppet linearly movable within the cavity along the common axis for selectively placing the said first and second ports into communication with the third port, and bias means for urging the poppet into a normal position to close the first port, and
   bellows means adapted to be exposed to the tire pressure and mounted in operative engagement with the poppet, the bellows means being precharged to a reference pressure and adapted to expand with decreasing tire pressure for moving the poppet from its normal position when the tire pressure decreases to a low limit value to open the first port to communication with the third port and emit a pneumatic signal to the outlet, the bellows, upon expansion, further being effective at a second lower limit value for moving the poppet into position to close the second port thereby preventing passage of tire air through the second port at tire pressures below the second limit value.

3. A low tire pressure sensor for emitting a signal when pneumatic tire pressure reaches a low limit pressure comprising:
   a signal device normally subject to atmospheric pressure and maintained in a nonsignalling mode in the normal tire condition and subject to tire pressure for actuation to a signalling mode when the tire pressure reaches the low limit pressure, and
   an air switch device having a chamber adapted to communicate with tire pressure, a bellows mounted within the chamber, a signal passage connected to the signal device, an air passage vented to atmosphere; and a valve for selectively connecting the chamber and the air passage with the signal passage,
   the valve comprising a cavity having first, second and third ports, the first port connecting the chamber with the cavity, the second port opposed to and aligned with the first port along a common axis and connecting the air passage to the cavity, the third port joining the signal passage to the cavity, and a control member in the cavity spring biased toward the first port to close the first port and open the second port during normal tire pressure condition to subject the signal passage and the signal device to atmospheric pressure supplied through the second port, and the control member being responsive to bellows movement for movement toward the second port for opening the first port and closing the second port when tire pressure drops to a low tire pressure condition thereby admitting tire air to the signal passage whereby the tire pressure is effective to actuate the signal device to signalling mode and the air passage to atmosphere is closed to avoid loss of tire air through the passage.

* * * * *